United States Patent [19]

Rockstrom

[11] Patent Number: 6,086,933
[45] Date of Patent: Jul. 11, 2000

[54] PROCESS FOR PREPARING DEHYDRATED VEGETABLE PRODUCTS

[76] Inventor: Erik I. Rockstrom, 6 Garrison Ct., Bell Mead, N.J. 08502

[21] Appl. No.: 09/327,089

[22] Filed: Jun. 4, 1999

Related U.S. Application Data

[60] Provisional application No. 60/088,207, Jun. 5, 1998.

[51] Int. Cl.[7] ....................................................... A23L 3/00
[52] U.S. Cl. .......................... 426/243; 426/465; 426/489; 426/506; 426/640
[58] Field of Search .................................... 426/243, 640, 426/465, 489, 506

[56] References Cited

U.S. PATENT DOCUMENTS

| | | |
|---|---|---|
| 3,574,643 | 4/1971 | Lewis . |
| 3,615,724 | 10/1971 | Sech . |
| 3,973,047 | 8/1976 | Linaberry et al. . |
| 4,073,952 | 2/1978 | Standing et al. . |
| 4,241,094 | 12/1980 | O'Neil et al. . |
| 4,341,803 | 7/1982 | Koshid et al. ........................ 426/242 |
| 4,664,924 | 5/1987 | Sugisawa et al. . |
| 4,707,370 | 11/1987 | Kakis . |
| 5,000,972 | 3/1991 | Natisi-Moraghar ..................... 426/333 |
| 5,071,661 | 12/1991 | Stubbs et al. . |
| 5,135,122 | 8/1992 | Cross et al. ......................... 219/10.55 |
| 5,292,542 | 3/1994 | Beck et al. . |
| 5,380,189 | 1/1995 | Clay et al. ............................ 426/438 |
| 5,492,704 | 2/1996 | Stubbs et al. . |
| 5,645,876 | 7/1997 | Subramaniam et al. ................ 426/50 |
| 5,707,671 | 1/1998 | Beck et al. . |
| 6,004,590 | 12/1999 | Subramaniam et al. ................ 426/50 |

*Primary Examiner*—Nina Bhat
*Attorney, Agent, or Firm*—Lerner, David, Littenberg, Krumholz & Mentlik, LLP

[57] ABSTRACT

A process for dehydrating vegetable products that are free of preservatives and chemicals, high in nutrient content, and have an improved taste and appearance is disclosed. In accordance with the present invention, whole, raw vegetables are first precooked with microwave energy for about 20 to about 60 seconds. After precooking, the vegetables are cut, ground, shaped, pressed, riced or rolled into a desired form, including, for example, chunks, crunches, strips, slices, chips, patties, flakes or powders. The vegetables are then dehydrated in the temperature range of about 130° F. to about 195° F. to a moisture content of less than 8%. The dehydrated vegetable products can then be reconstituted using hot or cold liquid or eaten directly as a finger food snack.

17 Claims, No Drawings

PROCESS FOR PREPARING DEHYDRATED VEGETABLE PRODUCTS

This application claims benefit under 35 USC 119(e) of Provisional Application No. 60/088,207 filed Jun. 5, 1998.

FIELD OF INVENTION

The present invention relates to a process for preparing dehydrated vegetable products. More particularly, this invention relates to a process for preparing dehydrated vegetable products that are free of preservatives and chemicals, high in nutrient content, and have an improved taste and appearance.

THE PRIOR ART

Dehydrated vegetable products are often preferred to fresh, raw vegetable products, due to the greater culinary versatility and the ease of handling, shipping and storage. Typically, a dehydrated vegetable product should have an indefinite shelf life. The dehydrated vegetable product should also retain the ability to be reconstituted to a semi-original state with the addition of water. In addition to these properties, it is also desired that the dehydrated vegetable product have a high nutrient content. A product that is deficient in any of these qualities may be deemed commercially unacceptable.

Processes for preparing dehydrated vegetable products involve the removal of water. Water removal, or drying, is necessary to control the amount of enzyme activity and microorganism activity that cause decomposition of the vegetables. Prior to dehydrating the vegetables, it is also desired to remove or significantly reduce (i.e., optimize) the starch content to improve the taste, appearance and handling of the product. See Beck et al., U.S. Pat. No. 5,707,671. The starch content is conventionally optimized by precooking (blanching) the vegetables in a water bath prior to dehydration.

Many processes have been described for producing dehydrated vegetable products. See generally, Standing et al., U.S. Pat. No. 4,073,952; Beck et al., U.S. Pat. No. 5,707,671; Stubbs et al., U.S. Pat. Nos. 5,071,661 and 5,492,704; O'Neil et al., U.S. Pat. No. 4,241,094; Kakis, U.S. Pat. No. 4,707,370; and Sech, U.S. Pat. No. 3,615,724. The processes disclosed in these patents differ in the manner in which the vegetables are dehydrated and/or the manner in which the starch content of the vegetables is optimized.

Unfortunately, dehydration processes generally produce vegetable products that lack the taste, color, and nutrient content of products prepared from fresh, raw vegetables. For example, dehydrated potato products often have an unappetizing white to grayish color and a bland taste. Freshly prepared potato products, on the other hand, have a semi-sweet taste and a translucent, yellowish color.

The undesirable characteristics of dehydrated vegetable products result from the loss of natural ingredients during the precooking and dehydration steps. For example, important volatile, aromatic flavor producing compounds are lost during the application of heat for dehydration. The air oxidation of labile flavoring compounds due to the temperatures required to dehydrate the vegetables also results in flavor distortion. In addition, precooking or blanching the vegetables, e.g., in a water bath, causes a loss of important nutrients, vitamins, and antioxidants into the cooking water.

To replace the ingredients lost during the dehydration process, manufacturers usually add artificial coloring and flavoring agents to the products. For example, browning in potatoes is controlled by the addition of color deterioration inhibitors, such as Sodium Bisulfite or an equivalent salt. Although moderate success has been obtained with artificial coloring and flavoring agents, dehydrated potato products do not contain the nutrient content and/or taste and appearance of products made from fresh, raw vegetables.

SUMMARY OF THE INVENTION

The present invention provides a method for producing dehydrated vegetable products that are free of preservatives and chemicals, high in nutritional value, and have excellent rehydration properties.

The dehydrated vegetable products in accordance with the present invention are prepared directly from whole, raw vegetables. The raw vegetables are first precooked with microwave energy for about 20 to about 60 seconds. After precooking, the vegetables are cut, ground, shaped, pressed, riced or rolled into a desired form, including, for example, chunks, crunches, strips, slices, chips, patties, flakes or powders. The vegetables are then dehydrated in the temperature range of about 130° F. to about 195° F. to a moisture content of less than 8%. The dehydrated vegetable products can then be reconstituted using hot or cold liquid or eaten directly as a finger food snack.

DESCRIPTION OF THE PREFERRED EMBODIMENTS

The dehydrated vegetable products in accordance with the present invention are prepared directly from whole, raw vegetables. The products may be prepared from any type of root and tuber vegetable, and more particularly from starch-containing vegetables such as, for example, potatoes, carrots, celery root (celeriac), beets, cassava, jicama, lotus root, parsnips, and rutabagas.

The whole, raw vegetables are first precooked with microwave energy. Preferably the vegetables are precooked with microwave energy for about 20 to about 60 seconds during which the microwave energy should be supplied in an amount of about 5.4 to about 6.5 kilowatts. More preferably the vegetables are precooked with microwave energy for about 20 to about 40 seconds.

The use of microwave energy in the precooking step provides starch optimization while avoiding the addition of water (e.g., from a boiling water bath) and/or extensive heat exposure (e.g., from a conventional oven). By avoiding the addition of water, important natural nutrients, vitamins, and antioxidants are not lost into the precooking water. Avoiding the addition of water in the precooking step also significantly reduces the time and temperatures required for drying the vegetable products. Consequently, by reducing dehydration times and/or temperature, a product having an improved taste and appearance is obtained.

The microwave energy may be supplied by any suitable microwave device, including, for example, a single door microwave oven or a two door, continuous microwave oven. Preferably, a two door microwave oven is used in which the vegetables enter the oven by a conveyor at one door and exit the oven by a conveyor at a second door.

After precooking the vegetables, the vegetables may be cut, ground, shaped, pressed, or rolled into a desired form, including, for example, chunks, crunches, strips, slices, chips, patties, flakes or powders. Vegetables that contain a skin, such as, for example, potatoes, can be prepared either with or without the skin of the vegetable.

Optionally, the vegetables may be rinsed and rapidly cooled before dehydrating. The cooling step stops the precooking process and further reduces the loss of coloring and flavoring ingredients due to heat application. Preferably, the vegetables are cooled to a temperature of about 55° F. to about 78° F. The vegetable may be cooled by chilling the vegetables at a temperature of about 34° F. to 48° F. for about 10 to about 20 minutes. Alternatively, the vegetables may be cooled by immersing them in a chilled water bath, preferably at a temperature of about 34° F. to 48° F. for about 10 to 20 minutes. Optionally, excess water can be removed by pressing or rolling the vegetable products.

The vegetables are then dehydrated. Optionally, additional foodstuffs may be added to the dehydrated product, including, for example, tomatoes, scallions, fish, meat, and cheese. Preferably, the additional foodstuffs are added prior to the dehydration process. Seasoning ingredients may also be added. If the seasoning material is added after dehydration, the seasoning material should preferably be dry.

The vegetables may be dehydrated using a conventional oven, a ball dryer, a drum dryer, a tray dryer, a vacuum dryer, or a microwave oven. Preferably, the vegetables are dehydrated using low temperature drying. The vegetables are preferably dehydrated at a temperature in the range of about 130° F. to about 195° F. for about 10 to about 40 minutes. More preferably the vegetables are dehydrated at a temperature of about 165° F. for 20 minutes to about 25 minutes, or until the desired moisture content is reached. Alternatively the vegetables may be freeze dried. Preferably, the vegetables are dehydrated to a moisture content of less than 8%. More preferably, the vegetables are dehydrated to a moisture content of less than 6% and even more preferably to a moisture content of less than 3%.

The vegetable products can then be packaged for use and distribution. Depending on the intended application, the vegetable products can be either directly consumed or reconstituted. For example, the vegetable products can be used directly as a finger food snack or in the form of a powder as a natural flavoring and/or thickening agent in soups and sauces. The vegetable products can also be reconstituted into other forms. For example, the dehydrated potato products may be reconstituted into mashed potatoes, baked potatoes, scalloped potatoes, hash brown strips, roasted potatoes, potato pancakes, latkes, or potato chips.

Dehydrated vegetable products produced by the method of the present invention can be rehydrated with about 4 parts to about 5 parts of cold or hot liquid to 1 part dehydrated vegetable product.

Vegetable products produced in accordance with the present method resemble products recently prepared from fresh vegetables in nutrient content, taste, texture, and color. For example, a dehydrated potato product produced in accordance with the present invention has a translucent yellowish color and semi-sweet taste.

The invention will be further described by reference to the following detailed examples. These examples are provided for the purposes of illustration only and are not intended to be limiting unless otherwise specified.

EXAMPLE I

Potato chunks for use as a finger food snack were prepared by microwaving whole, raw potatoes for 30 to 40 seconds per ounce. The microwaved potatoes were pressed and distributed onto a dryer. The temperature was in the range of 130° F. to 195° F. degrees. The potatoes were then dried at this temperature until the desired moisture content was reached.

EXAMPLE II

Mashed potatoes were prepared by microwaving whole, raw potatoes for 30 to 40 seconds per ounce. The microwaved potatoes were pressed and distributed onto a dryer. The temperature was in the range of 130° F. to 195° F. degrees. The potatoes were then dried at this temperature until the desired moisture content was reached. When rehydrated with hot water for 5 to 7 minutes, the potato chunks were used to form mashed potatoes.

EXAMPLE III

Scalloped potatoes were prepared by microwaving whole, raw potatoes for 21 to 27 seconds per ounce. The microwaved potatoes were sliced into 2–3 mm pieces and rinsed slightly in cold water before transferring them into the dryer at a temperature of about 130–195° F. The potatoes were dried until the desired moisture content was reached. The slices were rehydrated in hot water for 10–15 minutes and fried in a pan for 5 to 10 minutes.

EXAMPLE IV

Hash brown strips were prepared by microwaving whole, raw potatoes for about 24 to 30 seconds per ounce. From the microwaved potatoes, strips in length of 20–25 mm, with sides of 2–4 mm were prepared. The strips were slightly rinsed before feeding them into the dryer at 130–195° F. The potatoes were removed once the moisture content of less than 5% was reached. The potatoes were rehydrated in hot water for 10–15 minutes and fried in a stove pan for 5–10 minutes.

EXAMPLE V

Roasted potatoes were prepared by microwaving whole, raw potatoes for about 24–30 seconds per ounce. From the microwaved potatoes, pieces were cut into a size of about 10–15 mm. The potatoes were fed into a dryer at 130–195° F. and removed at a moisture content of less than 5%.

EXAMPLE VI

Potato chips were prepared by microwaving whole, raw potatoes for about 30–40 seconds per ounce. The microwaved potatoes were pressed with forks and then distributed onto a dryer in the range of 130° F.–195° F. The potatoes were dried at this temperature until the desired moisture content was reached. The chunks were ground into small granular flakes approximately 1–1.5 mm length (not into a powder). Room temperature water was added and the potatoes were pressed to form a flat dough-chip not thicker than 1.5 mm. A variety of herbs and spices were added to the potatoes. The chips were baked for 10–15 minutes at a temperature of about 365° F. to 425° F. The resulting potato chips are all natural and fat-free.

EXAMPLE VII

Sauce and soup conditioners were prepared by microwaving whole, raw potatoes for 36 seconds per ounce. The microwaved potatoes were pressed with forks and then distributed onto a dryer in the range of 130° F. to 195° F. The potatoes were dried at this temperature until the desired moisture content was reached. The potato chunks were removed from the dryer and ground into a fine powder for use as a natural fat-free conditioner as a natural thickening and/or flavoring agent in soups and sauces.

I claim:

1. A process for preparing dehydrated vegetable products having improved rehydration properties, comprising:

subjecting whole, raw vegetables to partial cooking using microwave energy for about 20 to 60 seconds, wherein said partial cooking optimizes starch content for starch conversion;

cutting or forming said vegetables into a desired size and shape; and rapidly dehydrating said vegetables at a temperature of about 130° F. to about 195° F. to a moisture content of about 8%.

2. A process according to claim 1, further comprising the step of dehydrating said vegetables at a temperature of about 165° F. for about 20 to about 40 seconds.

3. The process according to claim 1, further comprising the step of dehydrating said vegetables to a moisture content of less than 8%.

4. The process according to claim 1, further comprising the step of dehydrating said vegetables to a moisture content of less than 6%.

5. The process according to claim 1, further comprising the step of dehydrating said vegetable to a moisture content of less than 3%.

6. The method according to claim 1, wherein said whole, raw vegetables are selected from the group consisting of potatoes, carrots, celery, beets, cassava, jicama, malanga, lotus root, parsnips, and rutabagas.

7. The method according to claim 1, further comprising the step of prior to dehydrating said whole, raw vegetables, adding additional foodstuffs to said whole, raw vegetables.

8. The method according to claim 1, further comprising the step of adding seasoning to said dehydrated vegetables.

9. The method of claim 1, wherein said vegetables are dehydrated for about 10 to about 40 minutes.

10. The method of claim 1, wherein said vegetables are dehydrated for about 20 minutes to about 25 minutes.

11. The method according to claim 1, wherein said dehydrating step is accomplished by drying said vegetables in a microwave.

12. The method according to claim 1, wherein aid dehydrating step is accomplished by drying said vegetables in an oven.

13. The method according to claim 1, wherein said dehydrating step is accomplished by drying said vegetables in a tray dryer.

14. The method according to claim 1, wherein said dehydrating step is accomplished by drying said vegetables in a drum dryer.

15. The method according to claim 1, wherein said dehydrating step is accomplished by drying said vegetables in a ball dryer.

16. The method according to claim 1, further comprising the step of after subjecting said whole, raw vegetables to partial cooking, rapidly cooling said vegetables to a temperature of about 55° F. to about 78° F.

17. The method of claim 13, wherein said step of rapidly cooling said vegetables is accomplished using a chilled water bath.

* * * * *

UNITED STATES PATENT AND TRADEMARK OFFICE
CERTIFICATE OF CORRECTION

PATENT NO. : 6,086,933
DATED : July 11, 2000
INVENTOR(S) : Rockstrom It is certified that error appears in the above-identified patent and that said Letters Patent is hereby corrected as shown below:

Title Page, Item [76], "Bell" should read --Belle--.

Col. 6, line 11, "aid" should read --said--.

Signed and Sealed this

Tenth Day of April, 2001

*Attest:*

NICHOLAS P. GODICI

*Attesting Officer*  *Acting Director of the United States Patent and Trademark Office*